(12) United States Patent
Specht

(10) Patent No.: US 9,221,609 B2
(45) Date of Patent: Dec. 29, 2015

(54) ROLLER CONVEYING SYSTEM

(71) Applicant: D'Artecon Sagl, Arcegno (CH)

(72) Inventor: Dieter Specht, Arcegno (CH)

(73) Assignee: AVANCON SA, Riazzino (CH)

( * ) Notice: Subject to any disclaimer, the term of this patent is extended or adjusted under 35 U.S.C. 154(b) by 96 days.

(21) Appl. No.: 14/032,342

(22) Filed: Sep. 20, 2013

(65) Prior Publication Data

US 2014/0076684 A1     Mar. 20, 2014

(30) Foreign Application Priority Data

Sep. 20, 2012  (IT) ............... RM2012A0452

(51) Int. Cl.
  *B65G 39/04* (2006.01)
  *B65G 13/11* (2006.01)
  *B65G 39/02* (2006.01)

(52) U.S. Cl.
  CPC ............ *B65G 13/11* (2013.01); *B65G 39/02* (2013.01); *B65G 39/04* (2013.01)

(58) Field of Classification Search
  CPC ............................... B65G 39/04; B65G 39/02
  USPC ................................................. 193/37, 35 R
  See application file for complete search history.

(56) References Cited

U.S. PATENT DOCUMENTS

| | | | | |
|---|---|---|---|---|
| 2,860,766 A * | 11/1958 | Welter | ............... | B65G 13/11 193/37 |
| 3,559,782 A * | 2/1971 | Lesley | ............... | B21C 23/20 193/37 |
| 3,775,821 A * | 12/1973 | Somerville | ........ | B65H 3/0638 198/722 |
| 3,812,562 A * | 5/1974 | Lovett | ............... | B65G 39/06 29/234 |
| 3,847,260 A * | 11/1974 | Fowler | ............... | B65G 39/04 193/37 |
| 4,523,674 A * | 6/1985 | Haugen | ............... | B65G 39/06 193/37 |
| 4,720,007 A | 1/1988 | Milek | | |
| 6,105,746 A * | 8/2000 | Faisant | ............... | B65G 13/11 193/35 R |
| 6,550,609 B2 * | 4/2003 | Coen | ............... | B65G 39/04 193/37 |
| 2006/0037833 A1 * | 2/2006 | Lawless | ............... | B65G 1/023 193/35 R |
| 2010/0252393 A1 * | 10/2010 | Chen | ............... | B65G 39/04 193/37 |

FOREIGN PATENT DOCUMENTS

DE   102009044457 A1 *  5/2011 ............. B65G 39/02
EP    1 921 027 A1      5/2008

* cited by examiner

*Primary Examiner* — Gene Crawford
*Assistant Examiner* — Thomas Randazzo
(74) *Attorney, Agent, or Firm* — Young & Thompson

(57) ABSTRACT

A conveying system is provided that includes two axially spaced supporting frames extending substantially parallel in the conveying direction of the conveying system, at least one roller, at least one supporting shaft, each supporting shaft configured to be engaged in at least one of the supporting tubular frames to support the at least one driving roller, and at least one first supporting bearing for each supporting shaft. Each roller includes at least one roller body extending around a rotation axis X-X, at least one engaging seat for the at least one supporting shaft, placed concentrically to the roller body, and at least first removably coupling elements for a second roller, a cover or a spacer.

15 Claims, 9 Drawing Sheets

ROLLER CONVEYING SYSTEM

FIELD OF THE INVENTION

The present invention relates to a new roller conveying system in a roller path and particularly to a new modular roller system.

KNOWN ART

Roller conveying systems have been known for more than a hundred years and usually they comprise a plurality of rollers and/or wheels arranged to determine a feed path for products, such as boxes, parcels, suitcases, letters or packages in general, between an operative station and the following one.

These systems have a wide area of applicability such as post offices, airports and different kind of manufacturing or logistic industries involving the product handling among several operative stations in the production process or in the handling system thereof.

The documents U.S. Pat. No. 4,720,007 and EP1921027 disclose, for example, conveying systems according to the prior art.

A generally relevant problem found in the field by the Applicant is represented by the construction and assembly complexity of the known systems and, in particular, of their driving assemblies.

This complexity makes maintenance and/or cleaning operations difficult and time-consuming requiring also for this purpose the use of specific assembling tools.

The Applicant has further noticed that, because of the wide use range, it is useful to implement a variable and modular conveying system intended and designed specifically for every application.

The afore said need leads to great efforts for designing, manufacturing and storing models for factories producing this kind of conveying systems.

The Applicant arose the problem of standardizing and modularly making a new ROLLER conveying system so that it is simple to be customized, starting from a base structure similar for all models, with the object to became suitable for different use needs.

SUMMARY OF THE INVENTION

Therefore, in its first aspect the invention relates to a conveying system comprising:
  two axially spaced supporting frames extending substantially parallel in the conveying direction (F) of the conveying system;
  at least one plurality of rollers;
  at least one plurality of supporting shafts, each adapted to be engaged in at least one of said supporting tubular frames to support at least one roller;
  characterized in that each roller comprises:
  at least one roller body extending around a rotation axis X-X;
  at least one engaging seat for at least one supporting shaft, placed concentrically to said roller body
  at least first removably coupling means for a second roller, a cover or a spacer;
  at least a radial seat realized on the outer surface of said supporting shaft.

In the present invention scope the terms "axial", "axially", denote a direction substantially perpendicular to the feed direction (F) of goods in the conveying system.

The present invention, in the afore said aspect, may present at least one of the preferred characteristics herein after described.

Preferably, the housing seat comprises at least one radially inner rib corresponding to said at least a radial seat realized on the external surface of said shaft; said radially inner rib being adapted to be coupled with said a corresponding radial seat realized on the outer inner surface of said supporting shaft.

Conveniently, the housing seat comprises radially inner ribs which are angularly spaced, said shaft comprising three radial seats being correspondingly shaped and angularly spaced.

Advantageously, the system comprises a disc-shaped lid adapted to be coupled to said body by said coupling means.

Conveniently the conveying system comprises a spacer, to be placed between a roller and the subsequent one in the axial direction, comprising:
  at least one cylindrical portion extending in the direction of axis X-X;
  at least one flanged portion placed at one end of said cylindrical portion.

Preferably said disc-shaped lid and said spacer comprise a central tang comprising a side wall and adapted to define a coupling seat for said shaft; said central seat having at least one radial rib extending in the direction of X-X axis adapted to be coupled with a corresponding radial seat realized on said supporting shaft.

Conveniently the tang comprises a plurality of notches radially arranged along the X-X axis which extend from the radially inner end of the tang said notches separating the side wall in arched portions.

Advantageously the tang comprises at least one tooth at least partially arranged on a circumference; said supporting shaft having an annular seat adapted for engaging said tooth.

Preferably, the body comprises an outer surface and a plurality of supporting spokes extending between the central seat and said outer surface.

Advantageously, the outer surface comprises at least one layer made of polyurethane or any other elastomer or rubber.

Preferably, the outer surface comprises a preferably smooth cylindrical shape.

Alternatively, the outer surface comprises a plurality of transversal ribs extending in the same direction on the outer surface and tilted with respect to the rotation axis.

Still alternatively, the outer surface comprises a plurality of couples of transversal ribs extending on the outer surface; each couple comprising two transversal grooves tilted to form a vertex.

Alternatively, the outer surface comprises at least one circumferential rib.

Advantageously, the rollers with different outer surfaces have engaging seats with the same size to make them interchangeable.

Preferably, the engaging seat of the roller body comprises a radially internal surface, substantially sleek, adapted to be coupled with the outer surface of the supporting shaft; a lubricating grease being interposed between said radially internal surface and the outer surface of the supporting shaft.

BRIEF DESCRIPTION OF THE DRAWINGS

Further characteristics and advantages of the invention will be more evident from the detailed description of some preferred embodiments, but not exclusive, of a new roller conveying system in a roller path according to the present invention.

Such a description will be hereinafter explained referring to the attached drawings, provided for purposes of illustrations only, and thereby not limitative, wherein.

DETAILED DESCRIPTION OF SOME EMBODIMENTS OF THE INVENTION

Figure 1:
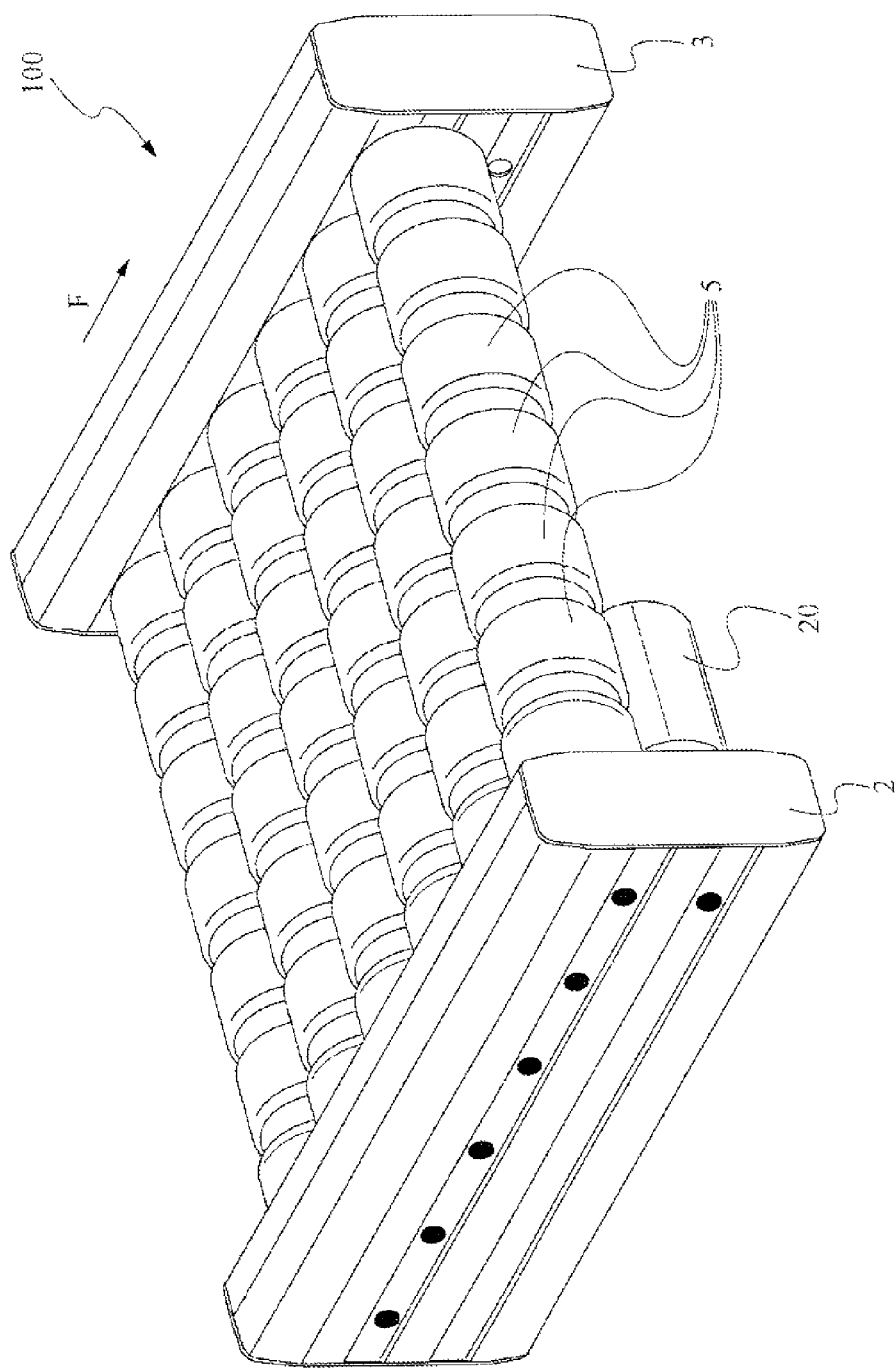
FIG. 1 is a schematic prospective view of a first embodiment of a conveying system according to the present invention.
Figure 2A:
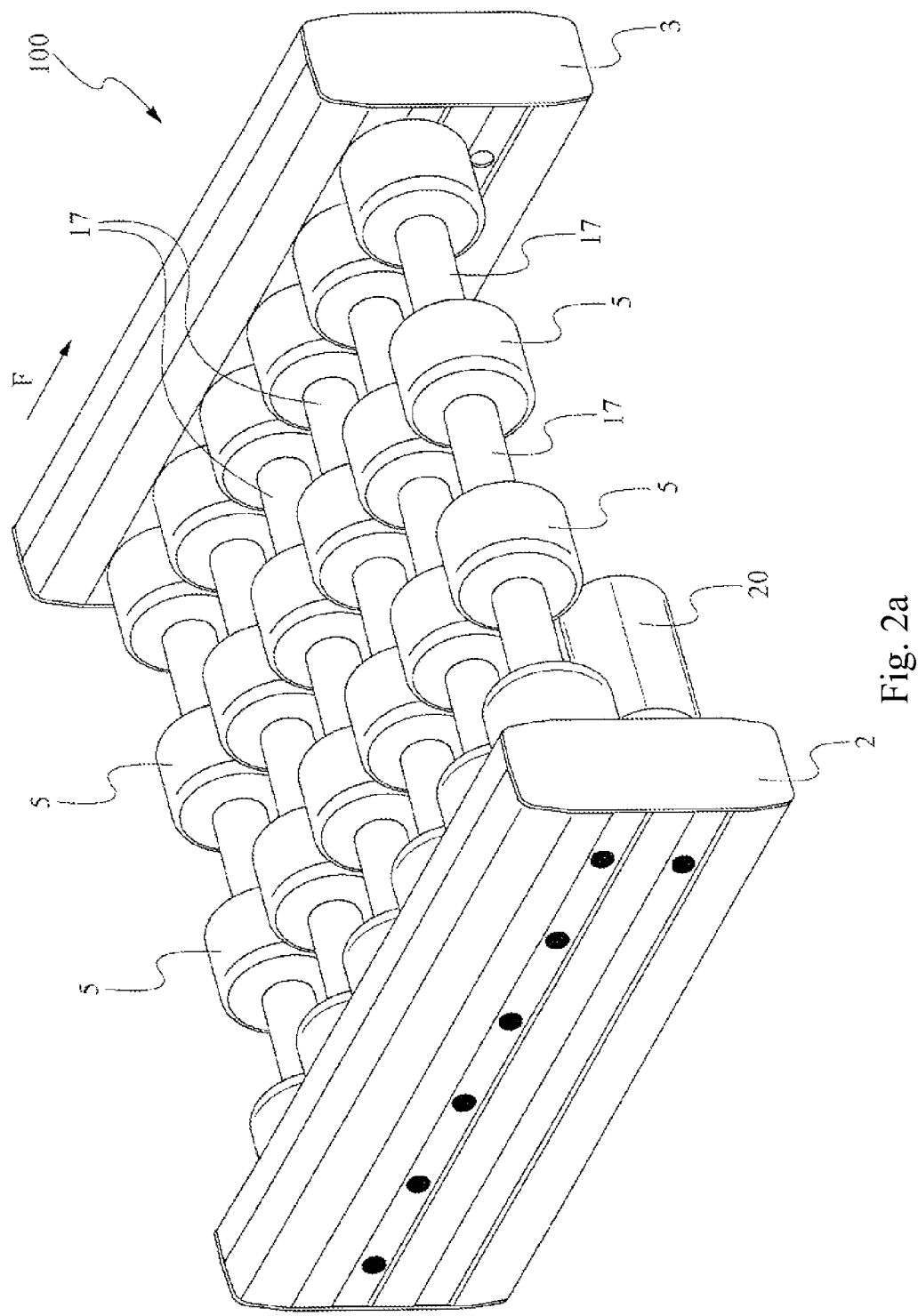
FIGS. 2a and 2b are schematic prospective views of a second embodiment of a conveying system according to the present invention.
Figure 2B:
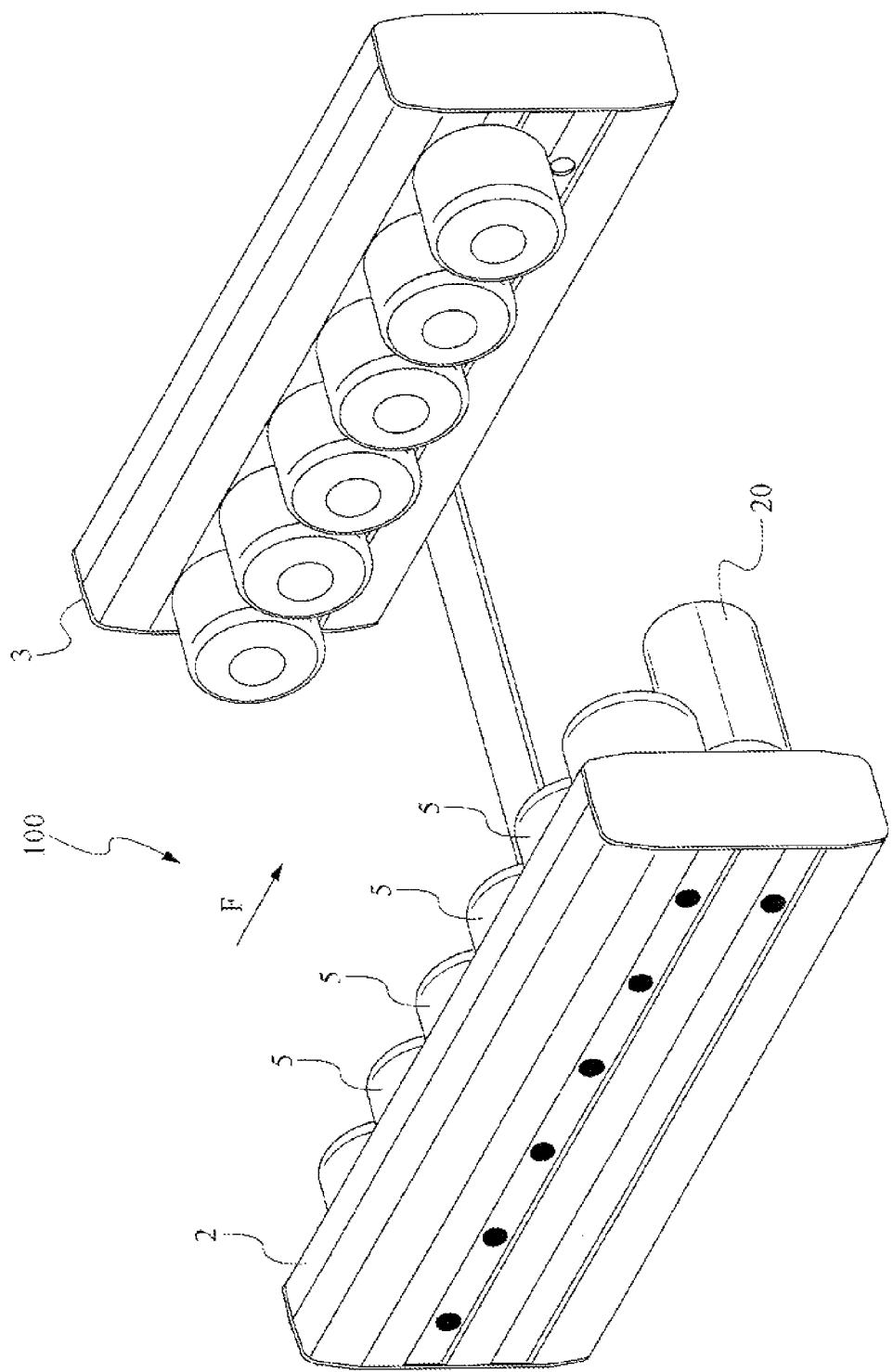

Referring to FIGS. 1, 2a and 2b, a conveying system, according to the present invention, is identified with the reference numeral 100.

The conveying system 100 has at least two axially spaced supporting tubular frames 2, 3 extending substantially parallel one another in the conveying direction of the conveyor 100. The conveying direction indicated by the arrow F in figures, indicates the extending direction of the conveyor 100.

A plurality of rollers 5 or rollers 4 is located between the two supporting tubular frames 2, 3.

The rollers 5 are rotatably mounted each on a supporting shaft 8 and they are operated by the assembly and a motor described in detail afterwards.

In the embodiment shown in the figures, the conveying system or conveyor 100 comprises a plurality of rollers 5 for each supporting tubular frame 2 or 3.

In other words, for each supporting tubular frame 2 or 3 there is a plurality of rollers 5 placed side by side which extend substantially along the whole length of the conveying system 100.

Each supporting shaft 8 is adapted to be engaged in at least one of said supporting tubular frame 2 or 3 to support at least one roller 5.

In detail, each supporting shaft 8 is rotatably constrained to the supporting tubular frame 2 or 3 by means of at least one bearing, arranged at the axially opposed inner walls of each tubular element 2 or 3.

The bearing, not shown in figures, is not directly constrained to the supporting tubular frame 2 or 3 but it is supported by the latter by means of a convenient housing.

Preferably, the bearing is a ball bearing, but a different bearing, such as for example a plain bearing, may be provided without departing from the protection scope of the present invention.

As used in the present invention scope, extending direction or extension of the conveying system is intended as a direction substantially parallel to the feeding direction (F) of goods in the conveying system itself.

Each supporting shaft 8 engaged in at least a bearing further supports a pulley moved by a specific belt and transmitting the motion to the driving roller 5.

The belt may be a V-belt, a toothed belt, a chain or another kind of belt, without departing from the protective scope of the present invention, so that the pulley is a pulley suitable for the type of running belt.

In particular, furthermore, with reference to the embodiment shown in FIGS. 1, 2a and 2b, the driving system consists of two pulleys, a first and a second one, for each supporting shaft. Because of the two pulleys, the assembling and disassembling of the conveying system 100 is easier and faster.

In order to use only one supporting shaft 8, for the sake of construction and maintenance simplicity of the conveying system 100, the two pulleys are assembled fixedly on the same supporting shaft 8.

The first of the two pulleys, preferably the one axially adjacent to the inner side wall of the supporting frame 2, 3 is designed to directly move the driving roller 5, whereas the second pulley is designed to transfer the motion, in other words it transfers the motion by a belt to another first pulley directly designed for the movement of a roller 5, preferably to the first pulley of an adjacent roller 5.

With reference to the embodiment shown in FIGS. 1, 2a and 2b, it can be seen a pulley keyed on the output shaft of a motor 20, and this transfers the motion to a first pulley of a roller 5 by means of a belt.

The driving system, namely the belt and pulley assembly, adapted to transfer the motion from the roller 5 to the other is fully enclosed inside the tubular frame 2 or 3 so as to reduce bulk or operator safety problems and, at the same time, giving an aesthetic value to the conveying system not being affected by kinematic and roller systems outside the frame.

The motor 20 is preferably an electric motor, although different kind of motors could be used without departing from the protective scope of the present invention.

Each supporting tubular frame 2 or 3 is made of two substantially specular and symmetric half-shells joined together by locking means, not shown in the figure.

By way of example, screws and bolts can be provided as locking means adapted to engage in corresponding slots, generally positioned in the lower portion of the tubular frame itself, in both the half-shells.

According to an important aspect of the present invention, the conveying system comprises first removably coupling means for a second driving roller, a lid or a spacer.

Thanks to the presence of the removably coupling means, the conveying system 100 can be arranged based on the particular working needs.

For this purpose, the supporting shaft 8 of the roller s 5, according to an embodiment, is a shaft adapted to have at least one portion with a shaped outer profile.

Such a portion, that could also extend axially all along the shaft, allows the engagement of the shaft in a counter-shaped seat arranged on the roller 4 so that the latter could be keyed on the shaft 8.

By way of example, with reference to the embodiment shown in FIG. 5, the supporting shaft 8 can be provided at least one, preferably three, groove 32 extending all along the shaft and angularly spaced along the outer circumference of the supporting shaft 6.

The three grooves 32 are adapted to receive three counter-shaped ribs 33 of a roller 5 to engage the latter.

As shown in figures, each driving roller has at least one roller body extending around a rotation axis X-X, and having a substantially cylindrical shape, at least one engaging seat for the afore said supporting shaft 8 and at least first coupling means for a second driving roller 5, a cover or a spacer.

Therefore, by selecting what has to be combined with, i.e. a second driving roller 5, a spacer 17 or simply a cover) 18, it is possible to give modularity to the conveying system 100.

The rollers 5 are then all provided with the roller body 50 and the engaging seat 52 for the supporting shaft 8 and the first coupling means.

The engaging seat 52 of every roller has at least one radially inner rib 33 adapted to be coupled with a corresponding radial seat 32 realized on the shaft.

Preferably, in the embodiment shown in figures, the ribs 33 are in the number of three—and they are angularly spaced along the inner wall of the engaging seat 52 and they are radially protruding outwardly.

Figure 3A:
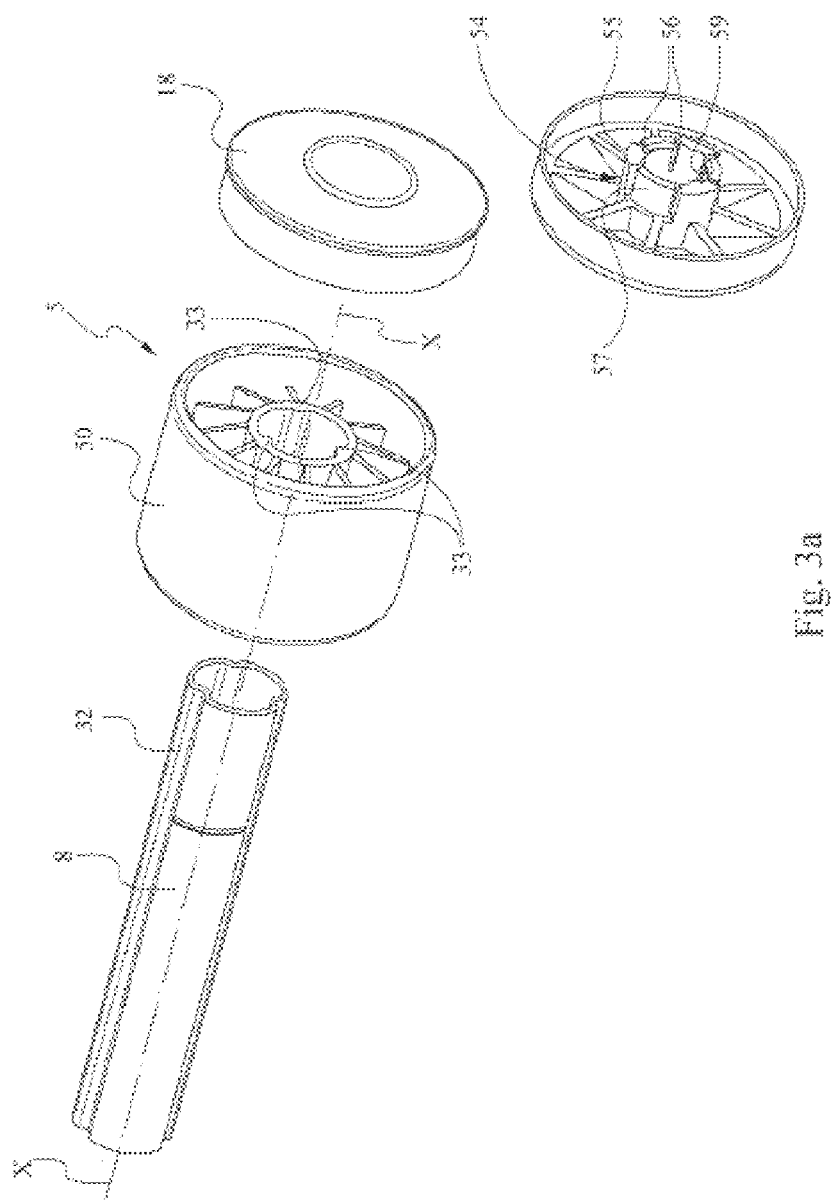
FIGS. 3a and 3b are partially exploded schematic views of a first embodiment of a roller and a spacer of the conveying system according to the present invention.

Each roller 5, in the embodiment shown in FIG. 3a, comprises a disc-shaped lid 18 adapted to be coupled to the roller body 50 by the removably coupling means.

In the embodiment of FIG. 3a, the removably coupling means of the disc-shaped cover 18 are represented by a central tang 54 comprising a side wall 55 adapted to define a coupling seat for the supporting shaft 8.

The coupling seat, provided in the central position, has at least one radial rib extending in the direction of X-X axis adapted to be coupled with a corresponding radial seat realized on said supporting shaft 8.

The central tang 54 further comprises a plurality of notches 56 arranged radially and in parallel to the X-X axis on the side wall 55, the notches 56 separate the side wall 55 in arched portions 57 giving to the arched portions themselves a certain radial flexibility.

The central tang 54 further comprises at least one tooth 59 arranged on a circumference at the free end of the side wall.

The tooth 59 is dimensioned and shaped to be engaged in a corresponding seat 32 obtained on said supporting shaft.

As the tooth 59 is engaged in said annular seat 32, the disc-shaped lid is engaged with the roller body and the supporting shaft 8 thereby defining a possible configuration of a driving roller 5.

Alternatively, the roller body 50 may be combined with a second roller body 50 completely similar to the first and the latter to the disc-shaped cover, in this last case a conveying system provided with two (or more) coupled roller is implemented.

In this case both the roller bodies 50 and the disc-shaped cover are keyed on the supporting shaft 8.

Thanks to the system modularity the conveyor may be arranged in a different way, for example as shown in FIG. 1, it is possible to provide several roller bodies 50 located one after another in an axial direction between a tubular frame 2 and the other. Whereas the final is closed with the disk 18

As shown in the embodiment of FIG. 2a, a spacer 17 may be provided between a roller body 50 and the subsequent in the axial direction.

Figure 3B:
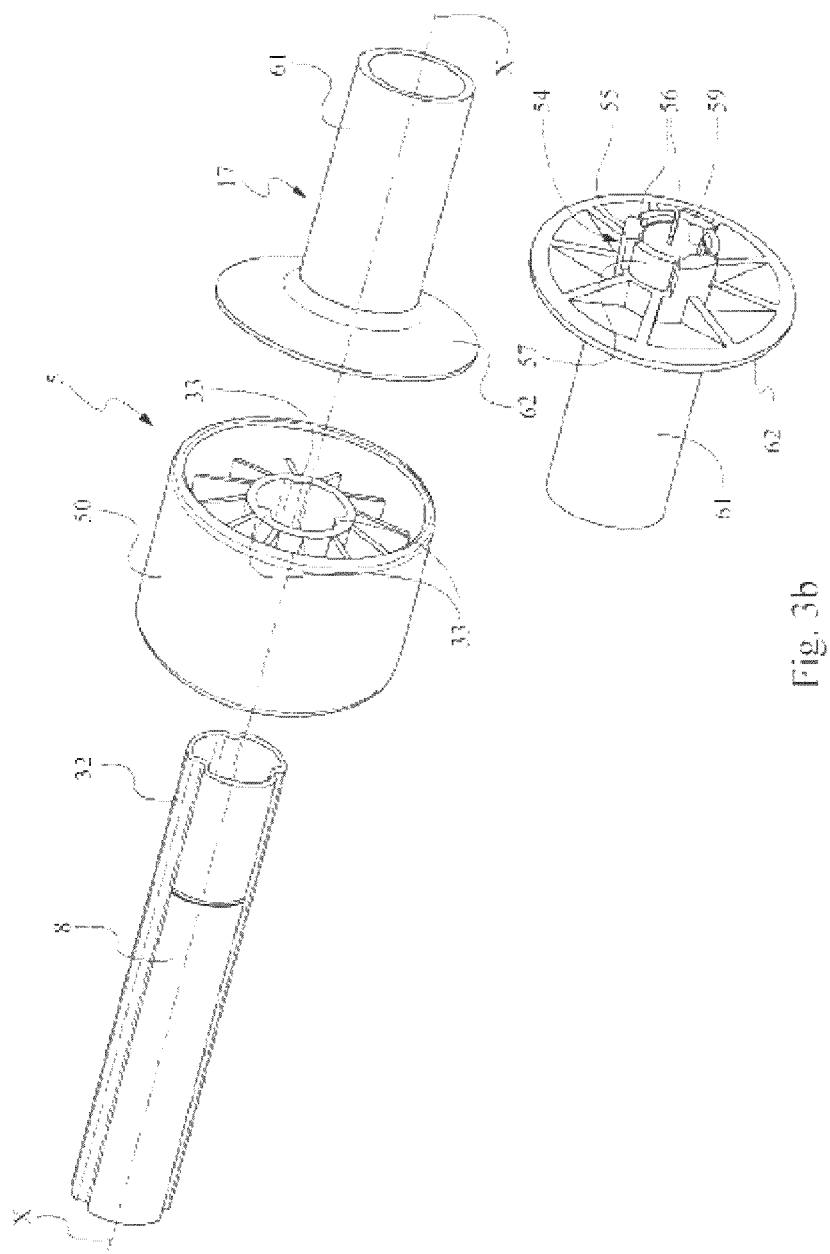

The spacer 17, as better shown in FIG. 3b, comprises a cylindrical portion 61 extending in the direction of X-X axis, a flanged portion 62 placed at one end of the cylindrical portion and a removably coupling means for coupling with a roller body.

The flanged portion 62 has a diameter substantially corresponding to the diameter of the roller body 50 and the cylindrical portion extends in an X-X direction for a predetermined length.

In the embodiment the removably coupling means of the disc-shaped lid 53 are represented, in this case too as the disc-shaped lid, by a central tang 54 comprising a side wall 55 adapted to define a coupling seat 56 for the supporting shaft 8.

The coupling seat, provided in the central position, has at least one radial rib extending in the direction of X-X axis adapted to be coupled with a corresponding radial seat realized on said supporting shaft 8.

The central tang 54 further comprises a plurality of notches 56 arranged radially and in parallel to the X-X axis on the side wall 55, the notches 56 separate the side wall 55 in arched portions 57 giving to the arched portions themselves a certain radial flexibility.

The central tang further comprises at least one tooth 59 arranged on a circumference at the free end of the side wall.

The tooth 59 is dimensioned and shaped to be engaged in a corresponding seat 32 obtained on said supporting shaft.

As the tooth 59 is engaged in said annular seat 32, the spacer is engaged with the roller body 50 and the supporting shaft 8, a further roller body can be keyed downstream the spacer and lastly another spacer and so on up to the remaining supporting tubular frame.

The rollers 5 can be different one from another but all provided with a substantially cylindrical roller body 50 provided with an outer surface and a plurality of supporting spokes extending between the central seat 52, which is adapted to house the supporting shaft 8, and the outer surface 90.

The outer surface 90 may comprise at least one layer made of polyurethane and it may be made of polyurethane.

In FIGS. 4-7 some different embodiments of the rollers 5 are shown.

Figure 4A:
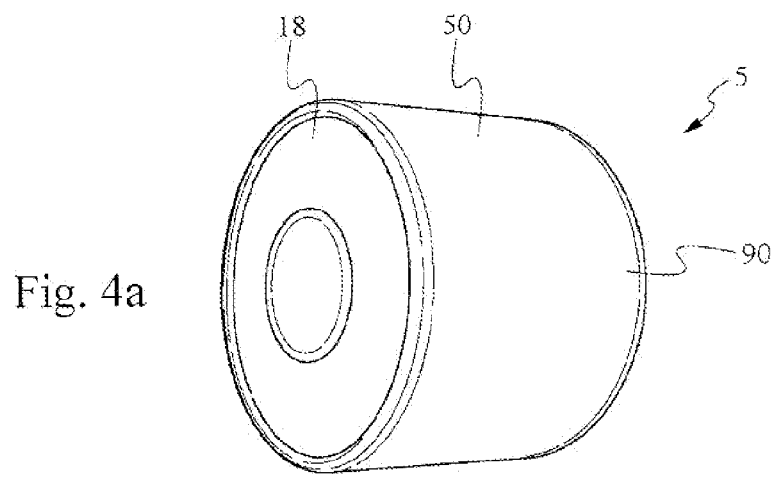
FIGS. 4a-4c are schematic enlarged views of a first embodiment of a roller.
Figure 4B:
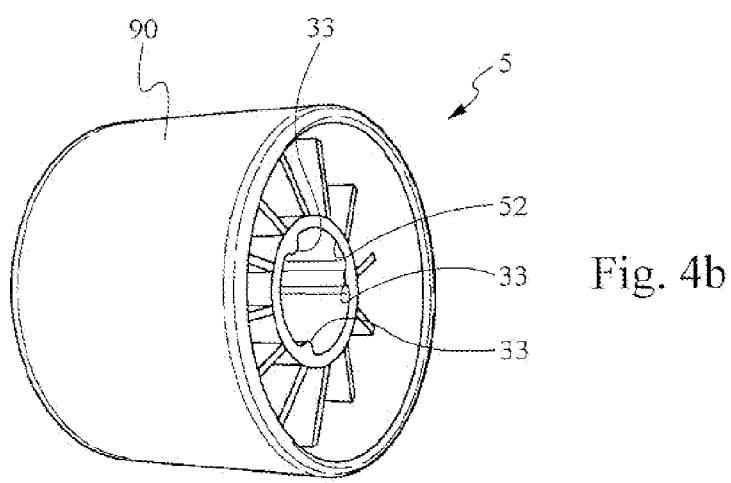
Figure 4C:
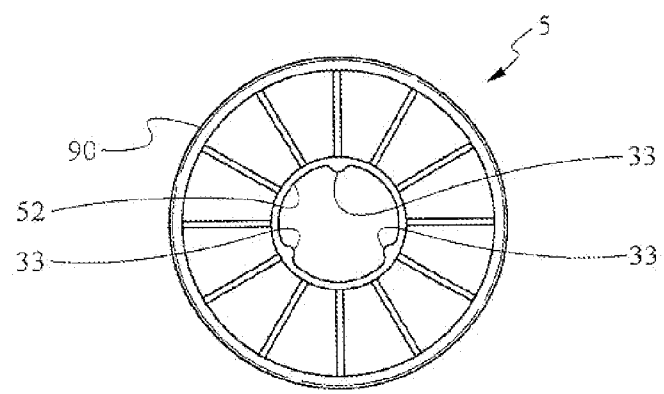

In detail, in the embodiment of FIGS. 4a-4c, the outer surface 90 has a substantially completely smooth surface.

Figure 5A:
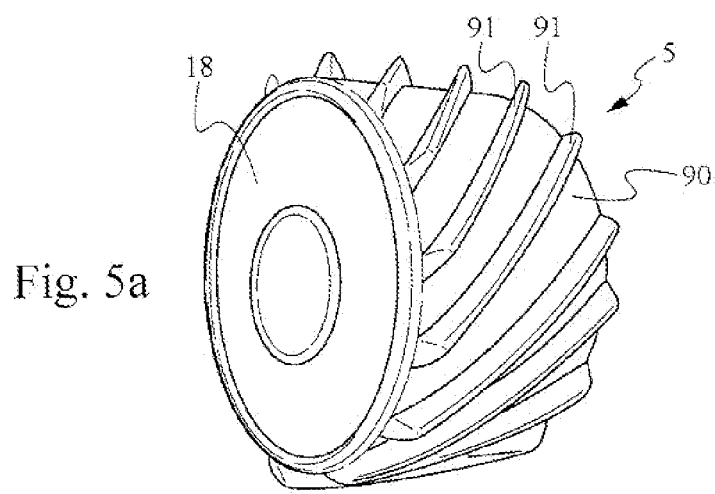
FIGS. 5a-5c are schematic enlarged views of a second embodiment of a roller.
Figure 5B:
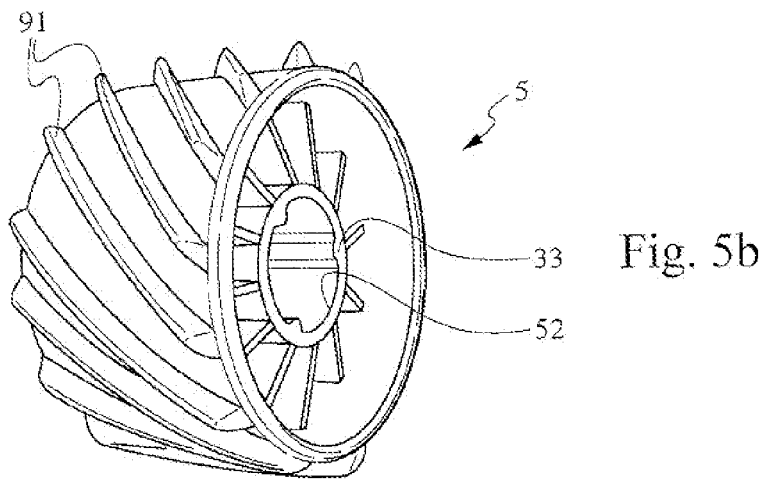
Figure 5C:
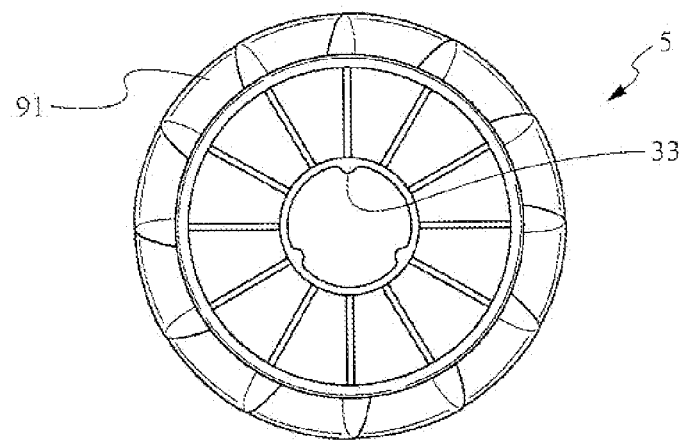

In FIG. 5a-5c a second embodiment of the roller 5 is shown, in which the outer surface 90 comprises a plurality of ribs placed side by side along an outer surface 90, which extend in an axial direction and tilted with respect to the rotation axis.

Several of such rollers, arranged one after another on the same supporting shaft 8 by a tubular element 2 to the subsequent one, implement a conveying system 100 or a portion of the latter allowing objects with different dimensions to be moved towards a conveying system side.

In other words, based on the tilt of the ribs, the different conveyed objects become closer to a tubular frame, for example to allow the passage next to an identifying device, such as for example a bar-code reader.

Figure 6A:
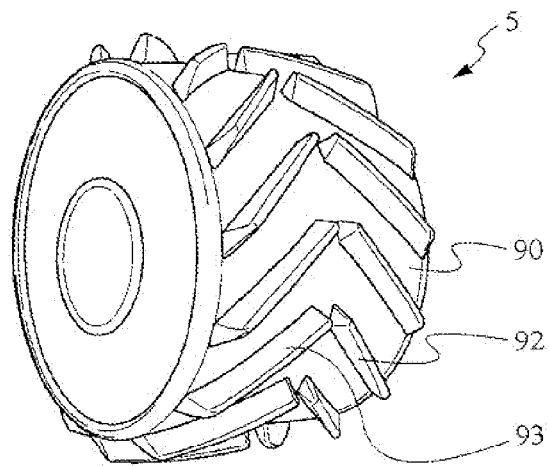
FIGS. 6a-6c are schematic enlarged views of a third embodiment of a roller.
Figure 6B:
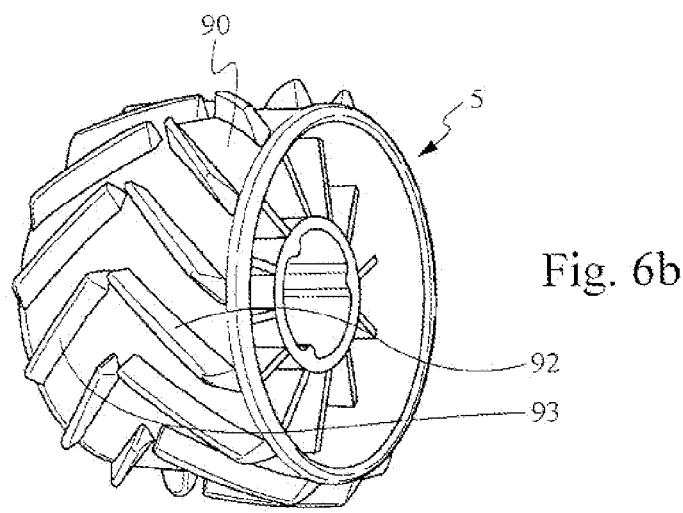
Figure 6C:
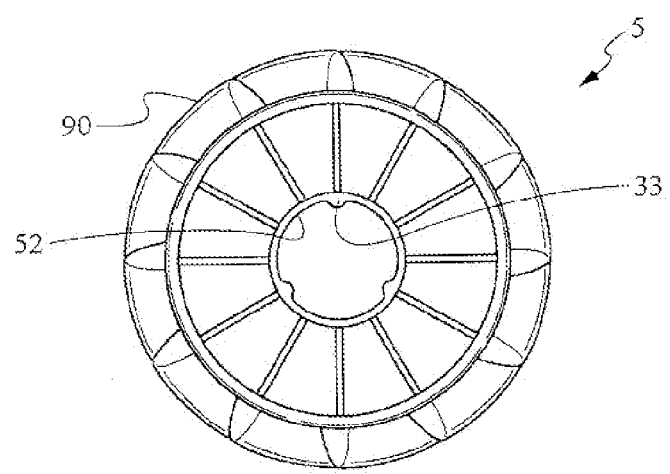

In FIG. 6a-6c another embodiment of the roller is shown, in which the outer surface 90 comprises couples of ribs 92, 93 which extend on the outer surface in an axial direction.

In the circumferential direction each couple is followed by a further couple spaced from the first up to complete the outer surface 90. Each couple comprises two grooves 92, 93 axially arranged and mutually tilted to form a vertex.

The afore said rollers, arranged one after another on the same supporting shaft 8 by a tubular element 2 to the subsequent one, implement a conveying system or a portion thereof allowing objects to be moved upwards and downwards.

Such a conveying system allows to carry out the same operations of a conveyor belts but eliminating completely the maintenance drawbacks of the latter.

Figure 7A:
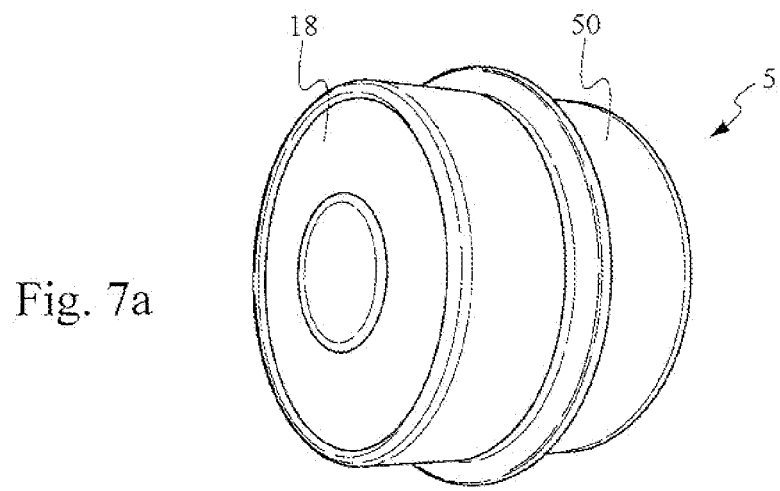
FIGS. 7a-7c are schematic enlarged views of a fourth embodiment of a roller
Figure 7B:
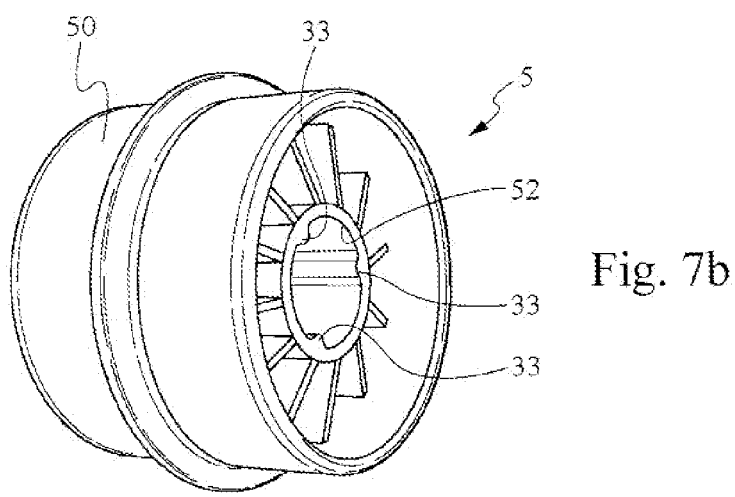
Figure 7C:
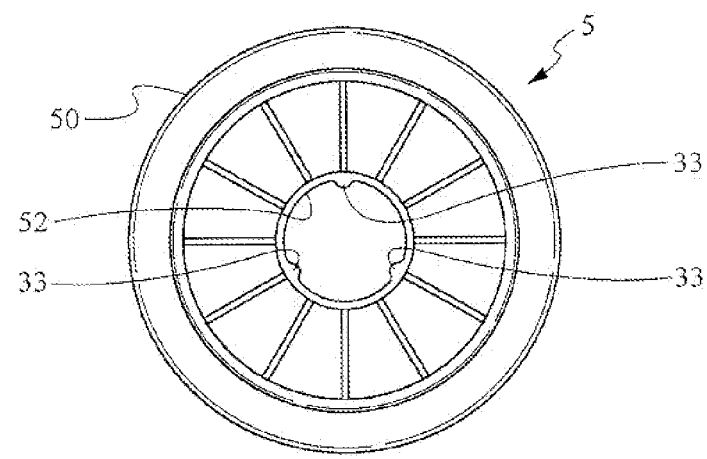

In FIGS. 7a-7c a further embodiment of the roller 5 is shown, in which the outer surface 90 is substantially smooth apart from a substantially continuous and circumferential rib 94 arranged at the center line in an axial direction of the roller body 50.

The afore said rollers, arranged one after another on the same supporting shaft 8 by a tubular element 2 to the subsequent one, implement a conveying system or a portion thereof allowing glasses, solar cells or fragile objects to be moved.

According to an important aspect of the present invention, the inner constructions and dimensions of all roller embodiments are always the same. This has the enormous advantage that only the rollers must being changed for production whereas the other parts of the system remain the same.

According to another embodiment of the invention not shown in the figures, the roller body comprises a friction drive system wherein the engaging seat of the roller body comprises a radially internal surface, substantially sleek, adapted to be coupled with the outer surface of the supporting shaft 8; a lubricating grease being interposed between said radially internal surface and the outer surface of the supporting shaft 8.

A lubricating grease like that it is used for example in fluid-heads of a tripod for holding and operating a video camera.

The present invention has been described referring to some embodiments. To the embodiments herein represented in detail may be made various modifications, anyway remaining in the protection scope of the invention, defined by the following claims.

The invention claimed is:

1. A conveying system comprising:
    two axially spaced supporting frames extending substantially parallel in the conveying direction of the conveying system;
    at least one roller;
    at least one supporting shaft, each of the at least one supporting shaft being configured to be engaged in at least one of said supporting frames to support at least one roller, each of the at least one roller comprises:
        at least one roller body extending around a rotation axis X-X,
        at least one engaging seat for at least one supporting shaft, placed concentrically to said roller body,
        at least first removable coupling means for a second roller, a cover or a spacer, and
        at least a radial seat on an outer surface of said supporting shaft,
    wherein the removable coupling means includes at least one central tang comprising a side wall and configured to define a coupling seat for said supporting shaft, said coupling seat having at least one radial rib extending in the direction of the X-X axis configured to be coupled with a corresponding radial seat on said supporting shaft.

2. The conveying system according to claim 1, wherein the engaging seat comprises radially inner ribs which are angularly spaced, said supporting shaft including three radial seats that are correspondingly shaped and angularly spaced.

3. The conveying system according to claim 1, further comprising a spacer comprising:
    at least one cylindrical portion extending in the direction of the axis X-X,
    at least one flanged portion placed at one end of said cylindrical portion, and
    at least one removable coupling means for coupling with said roller body.

4. The conveying system according to claim 1, wherein said tang comprises a plurality of notches radially arranged starting from the X-X axis which extend from the radially inner end of the tang, said notches separating the side wall in arched portions.

5. The conveying system according to claim 1, wherein said tang comprises at least one tooth at least partially arranged on a circumference thereof, said supporting shaft having an annular seat configured to engage said tooth.

6. The conveying system according to claim 1, wherein the outer surface comprises a substantially smooth cylindrical surface.

7. The conveying system according to claim 1, wherein the outer surface comprises a plurality of transversal ribs extending in the same direction on the outer surface and tilted with respect to the rotation axis X-X.

8. The conveying system according to claim 1, wherein the outer surface comprises a plurality of sets of transversal ribs extending on the outer surface, each set of transversal ribs comprising two transversal grooves tilted to form a vertex.

9. The conveying system according to claim 1, wherein the outer surface comprises at least one circumferential rib.

10. The conveying system according to claim 1, further comprising rollers with different outer surfaces that have engaging seats with the same size to make the rollers interchangeable.

11. The conveying system according to claim 1, wherein the engaging seat of the roller body comprises a radially internal surface configured to be coupled with the outer surface of the supporting shaft, a lubricating grease being interposed between said radially internal surface and the outer surface of the supporting shaft.

12. The conveying system according to claim 1, wherein the engaging seat comprises at least one radially inner rib corresponding to said at least one radial seat on the outer surface of said shaft, said radially inner rib being configured to be coupled with said corresponding radial seat on the outer surface of said supporting.

13. The conveying system according to claim 12, wherein said roller body comprises an outer surface and a plurality of supporting spokes extending between the engaging seat and said outer surface.

14. The conveying system according to claim 12, wherein said outer surface comprises at least one layer made of polyurethane or elastomer or rubber.

15. A conveying system comprising:
    two axially spaced supporting frames extending substantially parallel in the conveying direction of the conveying system;
    at least one roller;
    at least one supporting shaft, each of the at least one supporting shaft being configured to be engaged in at least one of said supporting frames to support at least one roller, each of the at least one roller comprises:
        at least one roller body extending around a rotation axis X-X,
        at least one engaging seat for at least one supporting shaft, placed concentrically to said roller body,
        at least first removably coupling means for a second roller, a cover or a spacer, and
        at least a radial seat on the outer surface of said supporting shaft; and
        a disc-shaped cover configured to be coupled to said roller body by said removably coupling means,
    wherein the removable coupling means includes at least one central tang comprising a side wall and configured to define a coupling seat for said supporting shaft, said coupling seat having at least one radial rib extending in the direction of the X-X axis configured to be coupled with a corresponding radial seat on said supporting shaft.

* * * * *